May 8, 1951
C. W. MUELLER
2,551,810
DEFLECTION BEAM TUBE
Filed July 9, 1947
3 Sheets-Sheet 1
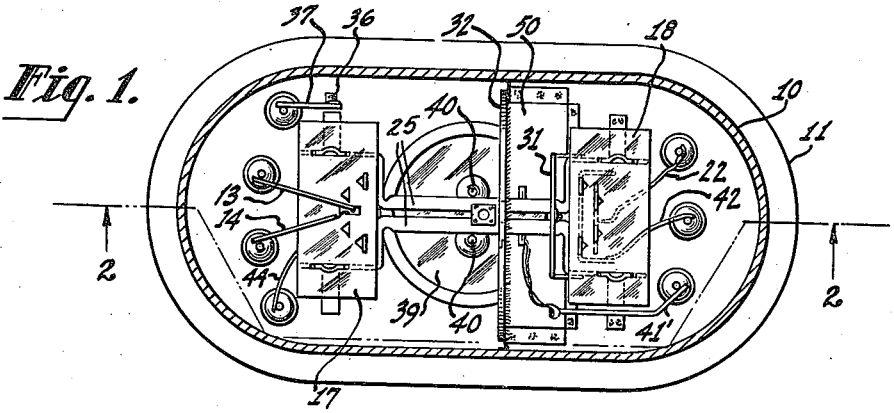
Inventor
CHARLES W. MUELLER
By
William A. Baksak
Attorney May 8, 1951     C. W. MUELLER     2,551,810

DEFLECTION BEAM TUBE

Filed July 9, 1947     3 Sheets-Sheet 2

Inventor
CHARLES W. MUELLER
William A. Zalesak
Attorney

May 8, 1951 C. W. MUELLER 2,551,810
DEFLECTION BEAM TUBE

Filed July 9, 1947 3 Sheets-Sheet 3

Inventor
CHARLES W. MUELLER
By William A. Balesak
Attorney

Patented May 8, 1951

2,551,810

UNITED STATES PATENT OFFICE 2,551,810

DEFLECTION BEAM TUBE

Charles W. Mueller, Princeton, N. J., assignor to Radio Corporation of America, a corporation of Delaware Application July 9, 1947, Serial No. 759,769

15 Claims. (Cl. 250—27.5)

This invention relates to electron discharge devices and particularly to beam-deflection tubes suited for use in frequency conversion or for other uses in which the tube output is a function of two independent voltages.

It is an object of the invention to provide a converter or mixer tube for superheterodyne receivers which insures substantial isolation between electrodes of the tube upon which are respectively impressed the received signal voltage and the local oscillator voltage, substantially to eliminate, over a wide range of frequency and without need of any balancing adjustments, radiation of power at local oscillator frequency which could interfere with reception by other receiving equipment or betray the presence of the receiver.

It is also an object of the invention to provide a construction for beam-deflection tubes which is suited for mass production and yet affords the high accuracy of electrode positioning which is essential to proper functioning of tubes of this type.

In accordance with the invention, one section of a beam tube in which are disposed electrodes which produce, define and deflect the beam is electrostatically isolated from a second section of the tube in which are disposed other electrodes which deflect, intercept and collect the beam electrons; more specifically, a received signal voltage is impressed upon deflection electrodes in the first-named section of the tube and the local oscillator voltage is impressed upon other deflection electrodes which are disposed in the second section of the tube and isolated from the signal-deflection electrodes by an interposed shield member which is provided with a slot for passage of the electron beam therethrough.

Further in accordance with the invention, the beam-focusing electrode of the tube is formed by plate structure provided with integral wing shields which position insulating members utilized to support other electrodes of the tube including, for example, the cathode, a beam-forming electrode adjacent thereto, the collector electrode, and a suppressor electrode adjacent thereto. More particularly, all electrodes of the tube are mechanically attached to the aforesaid plate structure forming a rigid assembly with all electrodes immovably held in predetermined relative positions, and preferably this assembly unit is supported in the tube envelope at one point only intermediate its ends, as by the aforesaid shield member interposed between the deflecting electrodes.

The invention further resides in features of construction, combination and arrangement hereinafter described and claimed.

For illustration of a preferred form of the tube and of mixer circuits utilizing it, reference is made to the accompanying drawings, in which:

Figure 1 is a plan view of a beam tube, in section, taken on line 1—1 of Figure 2;

Figure 2 is a side elevational view of parts appearing in Figure 1 and is taken on line 2—2 of Figure 1;

Figure 3 is a plan view, in section taken on line 3—3 of Figure 2;

Figure 4 is a perspective view, on enlarged scale, of a deflection electrode shown in the preceding figures;

Figure 5 is a sectional view taken on line 5—5 of Figure 4;

Figure 6:
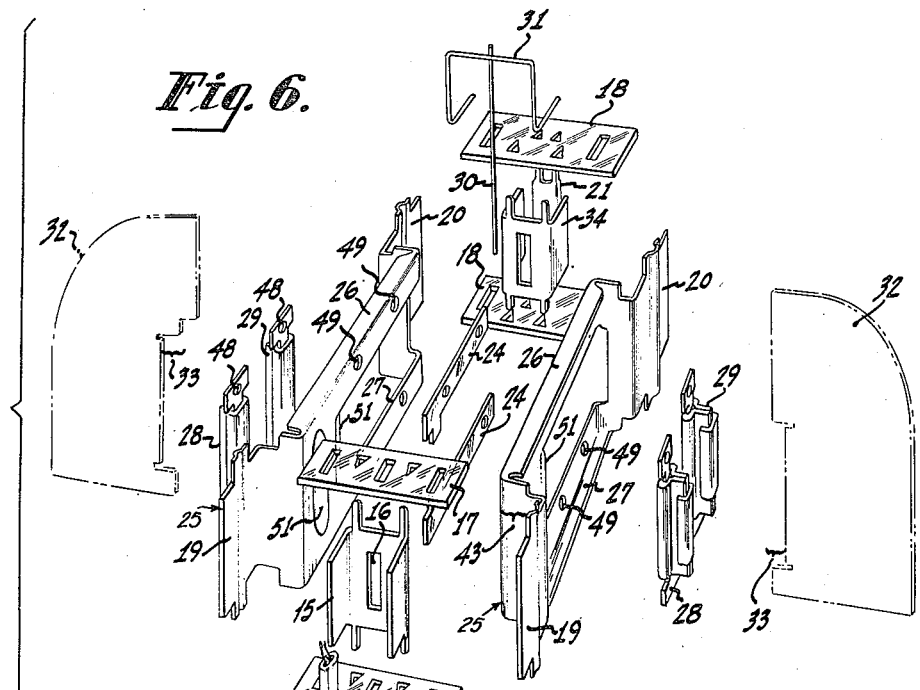
Figure 6 is an exploded perspective view of the electrodes and mounts therefor shown in Figures 1 to 3.

Referring to Figures 1 to 3, the tube envelope 10 and the base member 11 are of suitable metal to serve as part of a shielding system later herein discussed. After all of the tube elements have been assembled and mounted upon the base member 11, the base and envelope members are attached to each other, as by welding, and the tube is then exhausted and sealed. The cathode 12 of the tube is of the indirectly heated type, the heater leads 13—14 extending through suitable insulated seals attached to the base member 11. The beam-forming electrode 15, which at least partially surrounds the cathode, is provided with an aperture 16 through which a beam of electrons emitted from the cathode may pass. The proper relative position of the cathode and beam-forming electrode is provided for and maintained by the spacer members 17, of mica or other suitable insulating material, having slots or apertures which receive the electrodes or tips projecting therefrom.

The position of the spacers 17 with respect to other electrodes of the tube is precisely defined by the wing shields 19 having extensions or tips which project through openings in the spacers. The wing shields 19 are integrally formed extensions of a sheet metal aperture plate structure preferably formed of two separate, similar metal plates 25, 25 in the form of die-stampings rigidly attached to each other with a small separation between them forming an aperture for passage of the electron beam which passes through the aperture 16 of electrode 15. In the particular construction shown, the separation between the plate elements 25, 25 is defined by the thin, flat spacer strips 24, 24, of Figure 6. Adjacent the wing shields 19, the plates 25, 25 are embossed at 51 to form an electronic lens which shapes the beam into a thin ribbon of substantial width. The mounting of the spacers 17 upon the integral wing shields 19 of the same structure which forms the electronic lens insures stably fixed alignment of the lens apertures 52, 52 with the cathode 12 and the aperture 16 of the beam-forming electrode 15.

At their opposite ends, the plate members 25, 25, or equivalent, are shaped to form the integral wing shields 20, 20 which accurately position the spacer members 18, 18 used to position and mount the suppressor electrode 34 and the collector electrode 21. It is thus insured that the suppressor and collector electrodes are accurately located with respect to the narrow beam-space between the plate members 25 and that the aperture 35 of the suppressor electrode 34 is properly centered with respect to the normal plane of the electron beam issuing from the exit aperture 52 of the lens-forming electrode formed by the plates 25, 25. The spacer members 18, 18, like spacers 17, 17 are of mica or the like having electrode-positioning apertures or slots cut therein by a die-punching operation.

Beyond the lens-forming sections of the plate members 25, 25 and integral therewith, there are two parallel bars 26, 27 separated by a wide gap permitting the beam to be subjected to deflecting potentials. One pair of deflecting electrodes 28, 28 is mechanically attached to the plate or assembly structure 25, 25 at a point suitably located beyond the exit slit 52 and on opposite sides of the path of the electron beam. As hereinafter more fully described, these electrodes are insulated from each other and from the assembly structure 25, 25 for application between them of a difference of potential which is effective to deflect the beam in sense dependent upon the relative polarity of the electrodes and to extent dependent upon the magnitude of their potential difference. Two deflection electrodes are used, not only for enhanced sensitivity, but also to permit use of a balanced input circuit. For some uses of the tube, a single deflection electrode 28 is satisfactory.

Suitably located beyond the deflection electrodes 28, there is attached to the assembly members 25 a second pair of deflection electrodes 29 which are also electrically insulated from each other and from the support 25. These electrodes also bridge the gap between the upper and lower supporting members 26, 27 so that any difference of potential between them is effective to deflect the beam beyond the deflection produced by the first pair of deflection electrodes 28, 28. At some sacrifice of deflection sensitivity, only one deflection electrode need be used.

In the preferred form of tube shown, there is disposed beyond both sets of deflection electrodes, a beam-intercepting electrode 30 which specifically is a thin wire extending transversely of the narrow slot between plates 25, 25 and coincident with the undeflected beam. Specifically, the lower end of the wire is clamped between the horizontal members 27, 27 of the frame members 25 and the upper end of the wire is secured as by welding to the wire bridge member 31, whose ends are welded to the integral wing shields 20, 20 of the frame-assembly members 25. The bridge 31 serves as a spring holding the wire 30 taut at all times despite changes of its length due to changes in temperature.

All of the electrodes of the tube are thus integrally formed by or rigidly attached to the plate structure 25 to form an electrode assembly, all of whose parts are immovably held in precisely predetermined positions. With the construction shown, little manual skill is required in assembly to insure rapid and accurate positioning of all of the tube electrodes. Continuance of this precise positioning notwithstanding the mechanical shocks incident to handling and use of the tube is assured by mounting the electrode assembly as a unit at one region of support.

Preferably, and as shown in Figures 1 to 3, the electrode assembly is fastened, as by welding, to a sheet metal member 32 supported at its lower edge from the base member 11 of the tube. All the leads from the various electrodes are flexible. Consequently, when the tube is subjected to any mechanical shock, there are no restraints individual to the several electrodes which can effect either their relative movement or deformation of any parts mechanically interconnecting them. At most, the electrodes and their mount move as a unit with the support 32, which movement, of course, does not affect the relative alignment of the various electrodes. The thin flexible members 38 welded to the wing shields 19 and 20 and to the base member 11 serve as damping springs for movement of the electrode assembly and the mounting member 32 about the lower edge of the member 32 as a pivotal axis. These springs also serve as direct paths for high-frequency currents incident to some uses of the tube.

Figure 7:
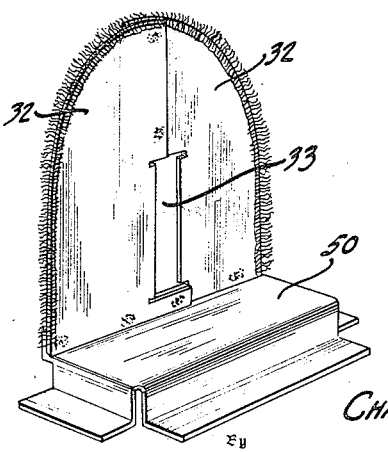
Figure 7 is a perspective view of a shielding structure shown in Figures 1 to 3 and 6.

The sheet metal member 32 not only provides a mount for the electrode assembly unit, but also in the form shown herein serves to divide the interior of the tube into two electrostatically isolated sections, in one of which are disposed the deflection electrodes 28 and in the other of which are disposed the deflection electrodes 29. Contact between the side and top edges of the shield 32 with the metal envelope of the tube may be effected by flexible wires, spring contacts or the like, as shown in Fig. 7. When the tube is used at very high frequencies, for example, at 1200 megacycles, actual physical contact has not been found necessary provided the edge of the shield 32 sufficiently closely approaches the inner surface of the metallic tube envelope. The shield 32, which for convenience of assembly may be formed of two similar half-plates, is provided with an opening 33 which embraces the electrode assembly at a region between the deflection electrodes 28, 29.

In the tube shown, the leads 40 extend from the deflection electrodes 28 in one section of the tube through the glass press 39 which extends into the other section of the tube. Consequently, to obtain complete shielding between the two sections of the tube, the lower edge of the shield member 32 is attached to the upturned flange of a cap shield member 50 having one open side which receives the inwardly projecting part of the press 39 and whose other sides are provided with downwardly extending flanges connected as by welding to the upper face of the base member 11.

Thus, the deflecting electrodes 28 and their leads 40, the beam-focusing electrode 51 and its leads 39, the cathode 12 and its heater leads 13, 14, the getter wire 36 and its lead 37 are all disposed in one shielded compartment or section of the tube, whereas the deflecting electrodes 29 and their leads 41, the intercepting electrode 30 and its lead 38, the suppressor electrode 34 and its lead 42, and the collector electrode 21 and its lead 22 are all disposed in a separate shielded compartment or section of the tube. All forms of coupling, electromagnetic and conductive as well as electrostatic, between elements in different sections of the tube have been minimized. It is thus assured that the two sections of the tube are practically completely shielded from the exterior of the tube and also from one another, so that when the tube is used as a high-frequency mixer, radiation of power at the oscillator frequency applied to one set of deflection plates is negligible and of such low magnitude as not to interfere with reception of signals by other receiving equipment in the immediate neighborhood or to betray the presence of the receiver using this tube. In fact, the radiation is several thousand times less than the radiation from similar ultra high-frequency receivers using mixers of the crystal type.

The line from the electrodes 29 to the associated local oscillator should be shielded to avoid radiation from it. The line may be of the unbalanced type; specifically, it is a concentric line 53 whose outer conductor, or at least the terminal end of it, is attached to the outer face of the base member 11 and hence is electrically connected through the shield member 32 to one of the deflection electrodes 29. The inner conductor 41 of the concentric line 53 is connected to and forms a continuation of the lead 41' which extends to the other deflection electrode 29. Preferably, the concentric line 53 is tuned so that the impedance of the line is substantially a maximum at the oscillator frequency.

The beam-deflection electrodes are each preferably of the type disclosed in my copending application Serial No. 561,339, filed November 1, 1941; now Patent No. 2,434,713, dated January 20, 1948, assigned to the assignee hereof. As most clearly shown in Figure 4 hereof, each of the deflection electrodes is formed by shaping a strip 47 of gold foil over a mica form 45 having ears or extensions 46 through which are punched holes 48. These holes are aligned with holes 49 in the frame members 25 to receive rivets effective to attach the electrodes to the plate members and to hold the plate members, electrodes and spacers together. With the construction shown, there is no mica in the beam region and consequently, the beam is not affected by any electrostatic charges which may accumulate on the mica. The spacing between the electrodes 29, to which the local oscillator-voltage may be applied, is preferably greater than the spacing between the electrodes 28 to which the signal voltage is applied in order that deflection of the beam by electrodes 28 does not result in the beam striking the electrodes 29. The proper spacing between the electrodes of each pair may be effected by using shims between the gold foil and the mica form or between the mica form 45 and the adjacent aperture frame 25.

Figure 8:
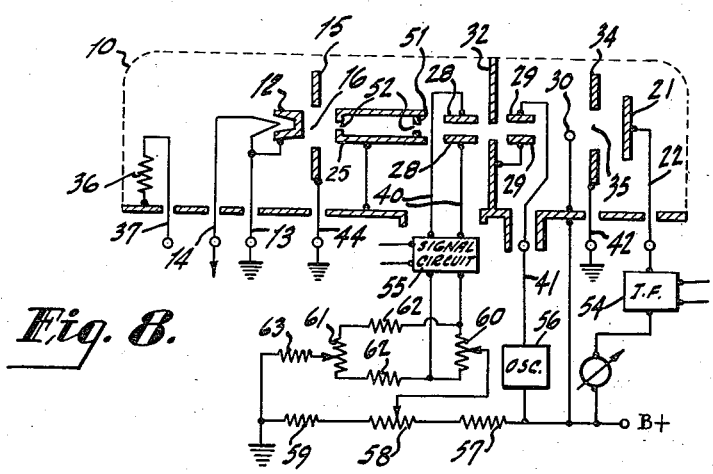
Figures 8 and 9 are schematic diagrams of mixer circuits utilizing the tube of the preceding figures.

Referring to Figure 8 as exemplary of one form of mixer circuit utilizing the tube described, the output or intermediate-frequency circuit, generically illustrated by block 54, is connected to the collector or output electrode 21 of the tube and the positive operating voltage of the collector electrode 21 is obtained by connection to a suitable direct-current source whose negative terminal may be connected to the suppressor electrode 34, the beam-forming electrode 15, to the cathode 12 and to one side of the heater source (not shown). The beam-intercepting electrode 30 is connected directly to the positive terminal of the collector-current source so that any variation of the current of the intercepter circuit does not traverse the intermediate-frequency circuit 54. The two deflection electrodes 29 are substantially at the same direct current potential with respect to the cathode, but they are connected to points of opposite potential so far as the local oscillator 56 is concerned. The signal-deflection electrodes 28, 28 are at substantially the same positive potential with respect to the cathode 12 but are of instantaneous opposite potential so far as the high-frequency applied to them from the signal circuit 55 is concerned. The lens-forming electrode 25 may be at the same direct-current potential with respect to the cathode as the beam-intercepting electrode 30; in other words, it may be connected directly to the shielding system of the tube comprising the envelope 10, base 11, and other metal parts directly connected thereto.

The network of resistors 57 to 63 is provided to obtain the various proper direct-current potentials required for focusing and centering of the electron beam. More specifically, the resistors 57, 58 and 59 form a potential divider circuit, the contact of resistor 58 being adjustable for beam-focusing purposes. The resistors 60, 61 and 62 form a bridge network, the resistors 60 and 61 being adjustable for beam-centering purposes. The resistor 60, for example, may be of relatively large magnitude and mounted on the receiver chassis for coarse or factory adjustment of the beam-centering whereas the resistor 61 may be of lower magnitude and located on the panel of the receiver for more precise centering of the beam by the operator.

Figure 9:
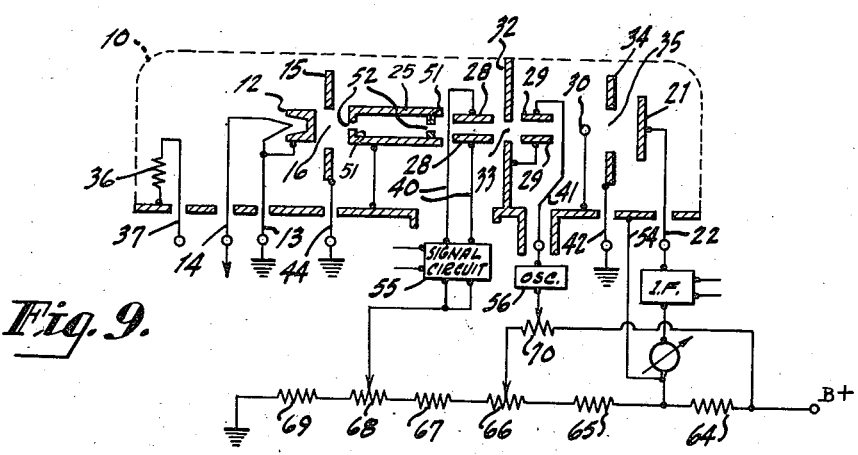

In the mixer circuit shown in Figure 9, a different resistor network for effecting focusing and centering of the beam is shown. The resistors 64—69 form a voltage divider across the terminals of a direct-current source of suitably high voltage. The direct-current voltage applied to the deflection electrodes 29 may be varied to effect coarse centering of the beam by adjustment of the variable contact of the potentiometer resistor 70. Fine centering of the beam may be effected by adjustment of the movable contact of the potentiometer 66. The focusing adjustment of the beam may be effected by variation of the contact of the potentiometer 68. The focusing and coarse centering controls may be located on the chassis for factory or service adjustment and the fine centering control may be located on the panel for adjustment by the operator.

Though particularly well suited for use as an ultra-high-frequency mixer tube, the tube may be used in any other system in which it is desired to obtain a current or voltage whose magnitude is a function of the instantaneous magnitudes of two independent voltages: from the foregoing description of the tube and of Figures 8 and 9, it is evident that the two independent voltages are respectively applied to the deflecting electrodes 28, 29 and the output circuit is connected to the collector electrode 21. The voltages applied to the deflection electrodes may be either alternating or direct.

In some aspects, the tube herein disclosed is similar to that disclosed and claimed in my co-pending application referred to above. Any claims to common features of construction appear in the earlier filed application.

It shall be understood the invention is not specifically limited to the particular tube construction or mixer circuits shown, but that changes and modifications may be made within the scope of the appended claims.

What is claimed is:

1. A beam-deflection tube having an envelope of conducting material comprising a first section in which are disposed a cathode, beam-forming electrode structure and beam-deflecting electrode structure, and a second section in which are disposed a collector electrode and beam-deflecting electrode structure, and a shielding system for electrostatically isolating said sections including a conducting shield extending across said conducting envelope disposed between said beam-deflecting structures and having a slot for passage of a beam of electrons from said cathode to said collector electrode.

2. A beam-deflection tube having an envelope of conducting material comprising a first section in which are disposed as elements a cathode, beam-forming electrode structure and beam-deflecting electrode structure, and a second section in which are disposed as elements a collector electrode and beam-deflecting electrode structure, a single structural unit assembly supporting said elements of both sections, and a shielding system for electrostatically isolating said sections including a conducting shield member supporting said assembly and extending across said conducting envelope intermediate said beam-deflecting structures and having a slot for passage of a beam of electrons from said cathode to said collector electrode along a path adjacent said beam-deflecting electrode structures.

3. A beam-deflection tube having an envelope of conducting material a cathode, electrode structure adjacent said cathode for forming a beam, deflection electrode structures spaced along the path of said beam successively to deflect the beam in accordance with voltages applied respectively thereto, an electrode for intercepting said beam for net null deflection thereof, a collector electrode beyond said intercepting electrode for terminating the path of the unintercepted beam, and a conducting shield member extending across said conducting envelope between said deflection electrode structures and normal to the path of said beam and having a slot for passage of the beam, whereby said deflection electrode structures are completely and independently shielded.

4. A frequency-mixer tube having an envelope of conducting material comprising a first section containing a cathode, electrode structure adjacent said cathode for forming an electron beam and deflecting electrode structure disposed adjacent said beam and to which a signal voltage may be applied; and a second section containing a deflecting electrode structure disposed adjacent said beam and to which an oscillator voltage may be applied and a collector electrode terminating the path of electrons succesively deflected by said deflecting-electrode structures; and a shielding system for electrostatically isolating said sections to minimize oscillator-frequency radiation independently of the frequency thereof including a conducting shield member extending across said conducting envelope between said beam-deflecting structures and having a slot for passage of said beam.

5. A frequency-mixer tube comprising a cathode, beam-forming electrode structure adjacent said cathode for directing a beam of electrons therefrom along a beam path, two pairs of deflection electrodes spaced along said path with the electrodes of each pair disposed on opposite sides of the path, a collector electrode in the path of said beam beyond said deflection electrodes, means connected to the pair of deflection electrodes nearest the cathode for applying a signal-frequency voltage thereto, means connected to the pair of deflection electrodes farthest from the cathode for applying an oscillator-frequency voltage thereto, and conductive shield means completely and independently enclosing said two pairs of deflection electrodes.

6. A frequency-mixer tube according to claim 5, wherein the separation between the beam deflection electrodes of the pair more remote from the cathode is greater than the separation between the electrodes of the other pair.

7. In a beam-deflection tube, a slotted shield member, an apertured beam-forming and electrode assembly structure extending through said shield member and mechanically and electrically connected thereto, and beam-deflecting electrodes mechanically secured to said structure on opposite sides of said shield member and electrically insulated from each other.

8. In a beam-deflection tube, a slotted shield member, plate structure extending through said shield member and mechanically and electrically connected thereto, beam-deflecting electrodes mechanically secured to said plate structure on opposite sides of said shield member and electrically insulated from each other, wing shields integrally formed from said plate structure and extending from opposite ends thereof, insulating members mounted upon and positioned by said wing shields, a cathode and an associated beam-forming electrode supported by the insulating members at one end of said plate structure, and a collector electrode and associated suppressor electrode supported by the insulating members at the other end of said plate structure.

9. An electrode arrangement for a beam-tube comprising a cathode, a beam-forming electrode, plate structure forming a focusing electrode for the beam and having integral wing shields, and insulating members positioned by said wing shields and supporting said cathode and said beam-forming electrode in accurate alignment with said focusing electrode and with said wing shields disposed about said cathode and said beam-forming electrode.

10. An electrode arrangement for a beam-deflection tube comprising a cathode, a beam-forming electrode, plate structure forming a focusing electrode for the beam and having integral wing shields, beam-deflecting electrodes attached to said plate structure in accurately fixed position with respect to said focusing electrode, and insulating members positioned by said wing shields and supporting said cathode and said beam-forming electrode in accurate alignment with said focusing electrode and with said wing shields disposed about said cathode and said beam-forming electrode.

11. An electrode arrangement for a beam tube comprising plate structure forming a focusing electrode for an electron beam and having integral wing shields, insulating members mounted on said wing shields, and a collector electrode supported by said insulating members in position to receive said beam.

12. An electrode arrangement for a beam-tube comprising plate structure forming a focusing electrode for an electron beam and having integral wing shields, a beam-collector electrode, an apertured suppressor electrode, and insulating members mounted on said wing shields and supporting said suppressor and collector electrodes in accurately fixed position with respect to said focusing electrode.

13. A beam-tube comprising plate structure forming a focusing electrode for an electron beam and having integral wing shields at both ends of said structure, a cathode, an apertured beam-forming electrode, insulating members positioned by the wing shields at one end of said plate structure and supporting said cathode and beam-forming electrode in accurate alignment with said focusing electrode, a collector electrode, an apertured suppressor electrode, and insulating members positioned by the wing shields at the opposite end of said plate structure and supporting said collector and suppressor electrodes in accurately fixed position with respect to said focusing electrode.

14. A beam-deflection tube comprising plate structure forming a focusing electrode for an electron beam and having integral wing shields at both ends of said structure, beam-deflecting electrodes attached to said plate structure, a cathode, an apertured beam-forming electrode, insulating members positioned by the wing shields at one end of said plate structure and supporting said cathode and said beam-forming electrode in accurately fixed position with respect to said focusing and deflecting electrodes, a collector electrode, an apertured suppressor electrode, and insulating members positioned by the wing shields at the opposite end of said plate structure and supporting said collector and suppressor electrodes in accurately fixed position with respect to said focusing and deflecting electrodes.

15. A high-frequency mixer circuit comprising a beam-deflection tube having two mutually shielded sections in which beam-deflection electrode structures are respectively disposed, a balanced line for impressing a received-signal voltage upon the deflection electrode structure in one of said sections, and an unbalanced line for impressing a local oscillator-voltage upon the deflection electrode structure in the other of said sections.

CHARLES W. MUELLER.

REFERENCES CITED

The following references are of record in the file of this patent:

UNITED STATES PATENTS

| Number | Name | Date |
| --- | --- | --- |
| 2,182,382 | Hollmann | Dec. 5, 1939 |
| 2,239,407 | Wagner | Apr. 22, 1941 |
| 2,302,786 | McGee et al. | Nov. 24, 1942 |
| 2,407,708 | Kilgore | Sept. 17, 1946 |
| 2,427,888 | Warren | Sept. 23, 1947 |
| 2,434,713 | Mueller | Jan. 20, 1948 |